INVENTOR
John W. Wakley

United States Patent Office 3,120,859
Patented Feb. 11, 1964

3,120,859
TESTING PLUG FOR SEWER LINES
John W. Wakley, 1092 Empey Way, San Jose, Calif.
Filed Sept. 18, 1961, Ser. No. 138,985
1 Claim. (Cl. 138—93)

This invention relates to plugs such as are inserted in the adjacent ground-level Y-fittings of sewer pipes or "soil lines" as they are called, to test for leaks in the plumbing system above such fittings.

Heretofore inflatable and expansible elongated plugs have been used for the purpose, but as presently constructed these plugs, when deflated after a test has been made, tend to be sucked into the sewer line by the sudden rush of released water through the fitting from above. If this occurred the plugs could not be retrieved, and were considered as being lost.

The principal object of this invention is to provide a plug for the purpose having a stop arranged so that the plug cannot be drawn into the sewer pipe by water flow, as above pointed out.

Another object of the invention is to construct or form the above mentioned stop so that it also serves to deflect water passing out between the plug and fitting at its outer end, so that such water, even when under a certain amount of pressure, will not be sprayed or thrown against the attendant plumber behind the plug and waiting to withdraw the same.

An additional object of the invention is to provide a testing plug for sewer lines which is designed for ease and ecomomy of manufacture.

It is also an object of the invention to provide a practical, reliable, and durable testing plug for sewer lines, and one which will be exceedingly effective for the purpose for which it is designed.

These objects are accomplished by means of such structure and relative arrangement of parts as will fully appear by a perusal of the following specification and claim.

Figure 1:
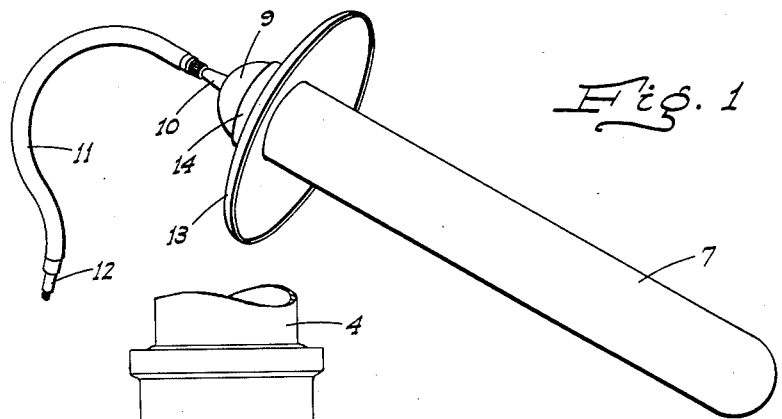
FIG. 1 is a perspective view of the testing plug, detached.

Referring now more particularly to the drawings and to the characters of reference marked thereon, the numeral 1 denotes a typical Y-fitting of a sewer line, and which fitting comprises an elongated horizontal leg 2 and an upstanding leg 3 connected to leg 2 intermediate the ends thereof. The fitting 1 is interposed in the sewer line, one section 4 of which is connected and upstands from leg 3 of the fitting 1, while another section 5 of the line is connected to and extends from the inner end of the fitting leg 2 to a connection with the usual underground sewer pipe. The outer end of the fitting is provided with a short tapped bushing 6 therein, normally closed by a screw plug (not shown) and which is removed when a test is to be made.

The improved testing plug comprises an elongated cylindrical hollow member 7 of expansible and flexible rubber or the like, whose diameter is such that when in a normal deflated condition, it will have a clearance fit in the bushing 6 and the leg 2 of fitting 1. The length of plug 7 is sufficient to enable it to span the opening 8 of the fitting leg 3 into leg 2 when the outer end or head 9 of said plug is still outside the fitting 1. Said head is thick and solid, as shown, and hence is non-expansible.

Fitted in and projecting forwardly from the head 9 is a stem 10 adapted for connection to a length of air hose 11 having a conventional type of check valve connected thereto at its outer end, as indicated at 12, for engagement with an air pump so that the plug 7 may be inflated and retained in that condition as long as may be necessary.

Projecting radially out from the head 9 is an enlarged mushroom shaped circular water deflecting shield 13, the shield being concave in facing relation to the fitting 1. The shield may be made integral with the plug 7, or it may be made separate and formed with a head-surrounding and engaging collar 14, which may be secured to the head by suitable means, such as cement, as indicated at 15.

Figure 2:
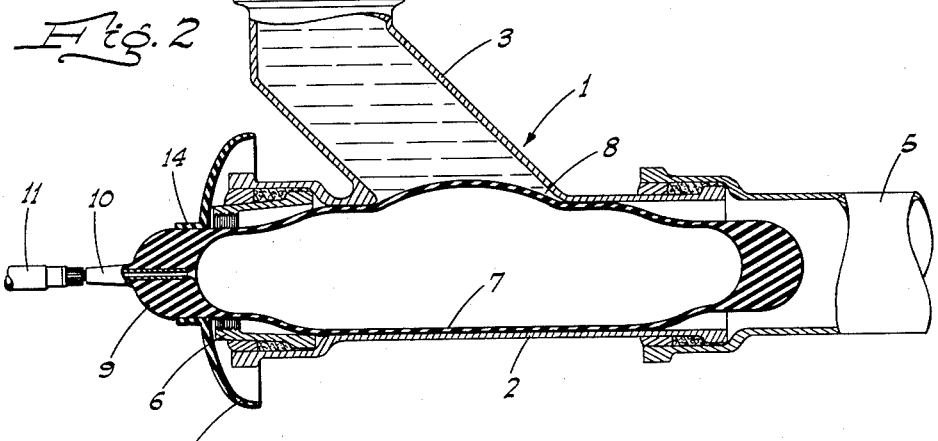
FIG. 2 is a longitudinal vertical section of the plug as inserted in an exposed fitting of a sewer line and inflated.

In operation, the deflated plug 7 is inserted into leg 2 of fitting 1 as far as possible, or until the bottom of the shield 13 abuts the outer end of the member 6 in the fitting 1. The plug is then inflated so that it will be expanded to tightly fit over and seal the opening 8, as shown in FIG. 2. Water is then allowed to fill the sewer line above the fitting 1, and including the pipe 4, in order to test for the absence or presence of leaks in any joints of the line.

Such tests being completed, the air is exhausted from the plug 7 so as to contract and enable the same to be withdrawn from fitting 1. Due to the angle at which the upper leg 3 of fitting 1 is disposed relative to the lower horizontal leg 2 of said fitting, the sudden flow of the released water from pipe 4 into the fitting 1 tends to pull the deflated plug 7 into the sewer pipe 5.

This would entail the loss of the plug, and is avoided with the present plug by reason of the shield 13 which forms a stop and limits inward movement of the plug into the fitting 1.

As long as the pressure flow remains relatively high, the shield is automatically held against the bushing 6, preventing leakage of water from the outer end of the fitting 1. When the water pressure has decreased to an extent such that there is no longer any tendency for the plug 7 to be pulled into the pipe 5, and said plug lies slack, some of the water in fitting 1, passing through bushing 6 and impinging against the shield 13, will tend to force the plug 7 outwardly.

Figure 3:
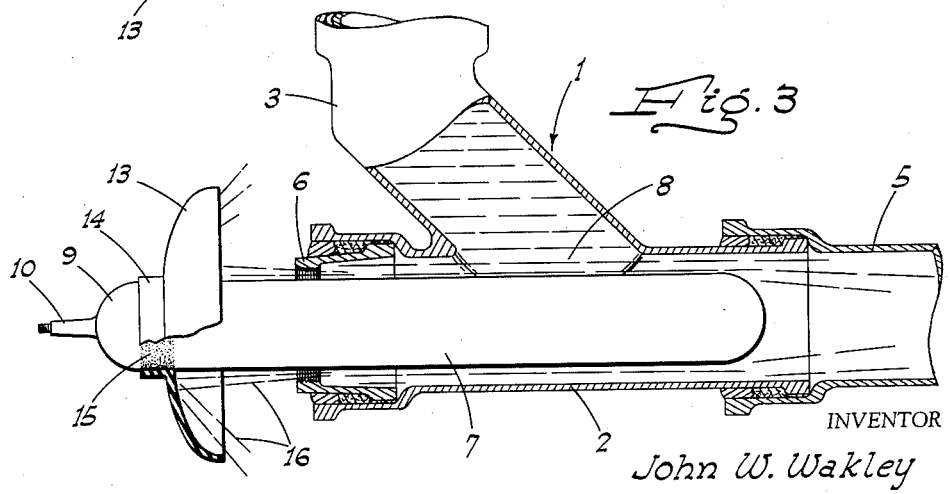
FIG. 3 is a similar view, but showing the plug as deflated and partially withdrawn from the sewer fitting.

The shield, being of internal concave form, and of materially greater inside diameter at its periphery than the outside of fitting 1 at its outer end, the water thrown against the interior of the shield from the bushing 6 is deflected radially out and toward the fitting 1, as indicated by the dash lines 16 in FIG. 3. The plumber, waiting behind the fitting 1 to withdraw the plug, will therefore not be sprayed by such water.

In some installations, and with a suitable fitting, the sewer line 4 connects with the leg 2, while the leg 3 is adapted to receive the removable screw plug. In such instance, and after removal of the screw plug, the testing plug is inserted in such leg 3 and thence projects into the leg 2 in the direction of section 5 of the sewer line. Thereafter, the device is used substantially as previously described.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claim.

Having thus described the invention, the following is claimed as new and useful, and upon which Letters Patent are desired:

A testing plug for the Y-fitting of a sewer line comprising an elongated expansible and inflatable cylindrical member adapted when deflated to be inserted into one leg of the fitting from the outer end thereof to engage in sealing relation when inflated with the inner end of the other leg of the fitting, a substantially solid and thick head formed on the outer end of the plug, a circular shield about and projecting radially outwardly from the head, and a collar on the shield engaging closely about and secured on the head; said head projecting longitudinally outwardly from the shield a sufficient distance to provide a knob for finger engagement.

References Cited in the file of this patent

UNITED STATES PATENTS

| | | |
|---|---|---|
| 329,773 | Perry | Nov. 3, 1885 |
| 702,937 | Franklin | June 24, 1902 |
| 775,124 | Christman | Nov. 15, 1904 |
| 2,309,429 | Ahern | Jan. 26, 1943 |
| 2,678,666 | Theis et al. | May 18, 1954 |

FOREIGN PATENTS

| | | |
|---|---|---|
| 604 | Great Britain | July 12, 1890 |